Oct. 20, 1959  F. G. BACK  2,909,109
REFLEX PHOTOGRAPHIC FINDER
Filed Jan. 13, 1958  3 Sheets-Sheet 1
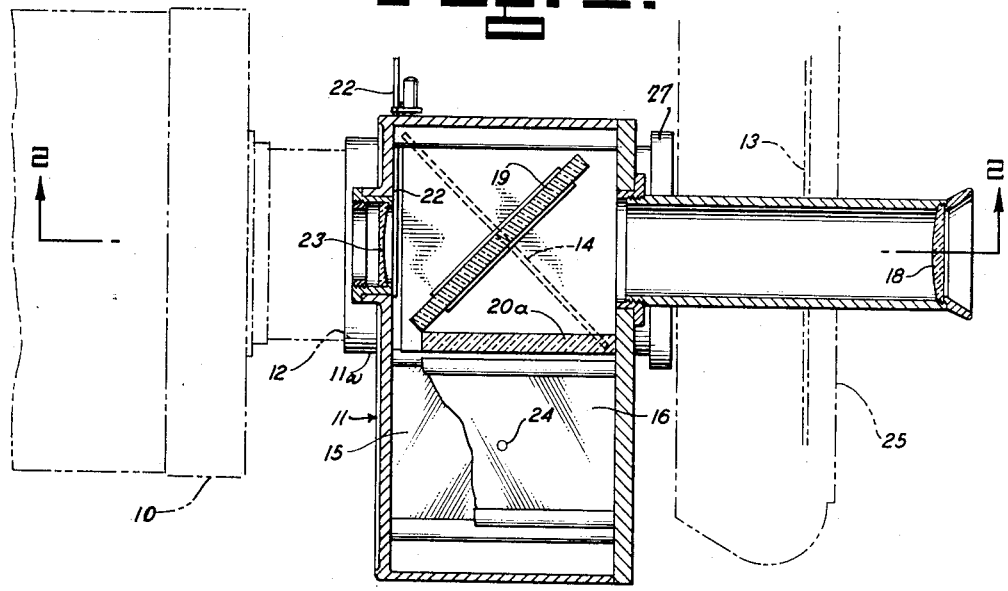
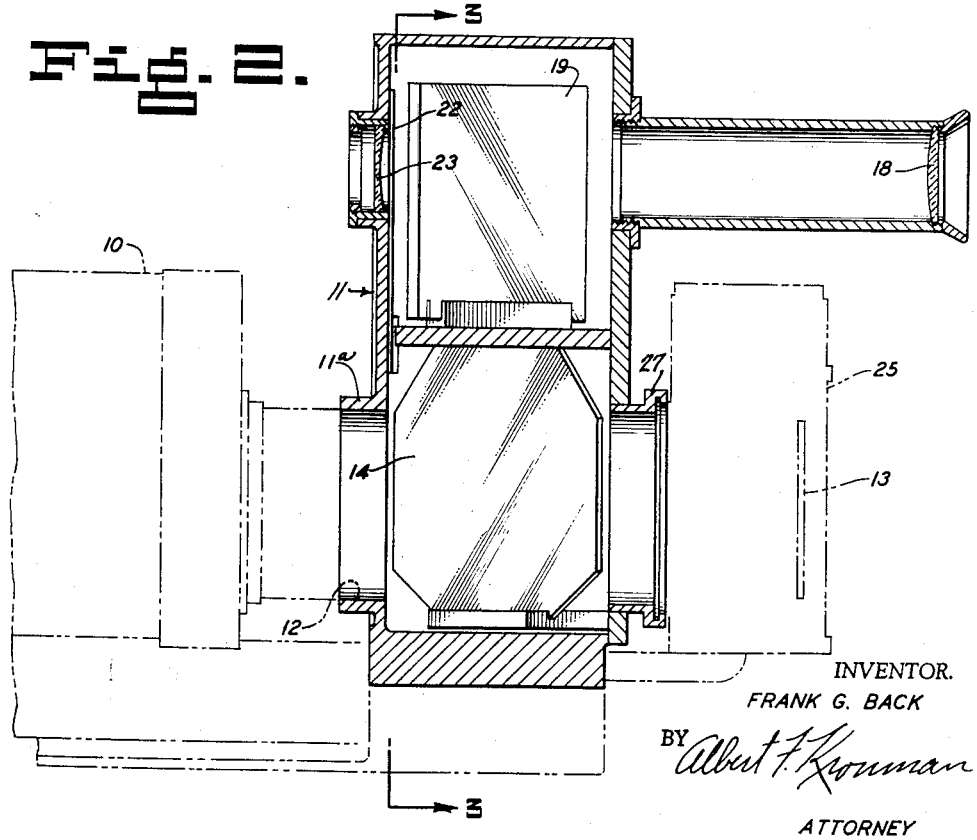
INVENTOR.
FRANK G. BACK
BY
ATTORNEY Oct. 20, 1959

F. G. BACK 2,909,109

REFLEX PHOTOGRAPHIC FINDER

Filed Jan. 13, 1958

INVENTOR.
FRANK G. BACK
BY Albert F. Kronman

ATTORNEY

Oct. 20, 1959   F. G. BACK   2,909,109
REFLEX PHOTOGRAPHIC FINDER
Filed Jan. 13, 1958

INVENTOR.
FRANK G. BACK
BY Albert F. Krouman
ATTORNEY

United States Patent Office 2,909,109
Patented Oct. 20, 1959

2,909,109

REFLEX PHOTOGRAPHIC FINDER

Frank G. Back, Lattingtown, N.Y.

Application January 13, 1958, Serial No. 708,426

4 Claims. (Cl. 95—42)

This invention relates to photographic finders and particularly to finders of the reflex type for use with telescopic lenses.

Where it is desired to use reflex type finders in conjunction with telescopic lenses, it is often difficult to keep a moving object within the field of the finder. This difficulty is particularly acute where the photographer is attempting to track a moving object which moves at a considerable speed.

Accordingly, it is an object of the present invention to provide a photographic finder, which alternately gives the photographer a choice of a close-up view or a wide angle view through the same eye-piece.

Another object of the present invention is to produce an upright image in the finder at all times.

A further object of the present invention is to provide a finder which will permit of easy target location through a convenient ring sight.

Still another object of the present invention is to provide tracking and follow focusing of a rapidly moving object through the same finder eye-piece.

A feature of the present invention is its use of a shutter to shift from close-up to wide angle views.

Another feature of the present invention is its use of partially reflective mirrors whereby follow focusing and target locating may be achieved with the same device.

The invention consists of the construction, combination and arrangement of parts, as herein illustrated, described and claimed.

In the accompanying drawings, forming a part hereof is illustrated one form of embodiment of the invention and in which:

Figure 1 is a vertical section taken on line 1—1 in Figure 3, looking in the direction of the arrows.

Figure 2 is a vertical section taken on line 2—2 in Figure 1, looking in the direction of the arrows.

Figure 3:
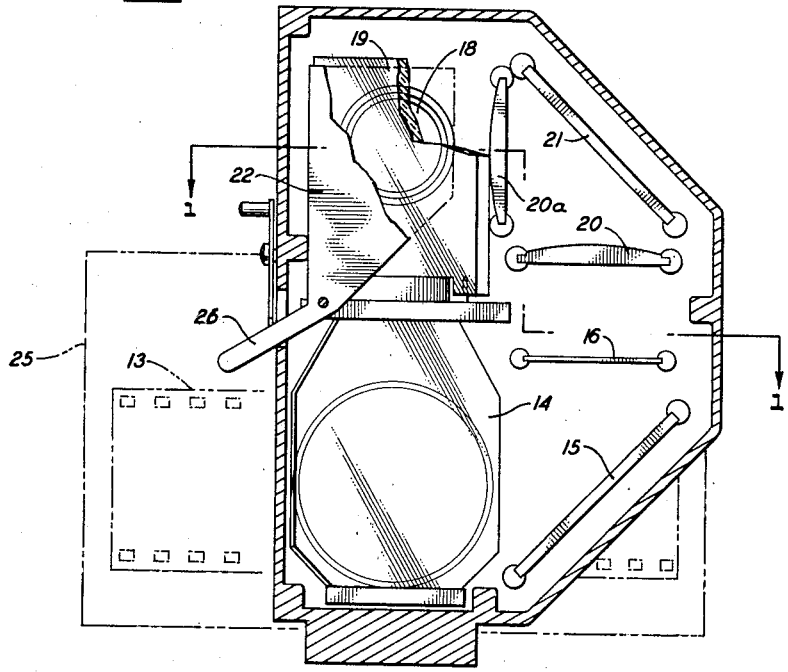
Figure 3 is a sectional view taken on line 3—3 in Figure 2, looking in the direction of the arrows.

Referring to the drawings, and particularly to Figures 1, 2 and 3, 10 indicates the barrel of a photographic lens, such as a telescopic lens, which is secured to the housing 11 of the reflex finder by a fitting 11a. The housing 11 is provided with an opening 12 (see Figure 2) to permit light coming from the lens 10 to enter the housing 11. Immediately behind the opening 12 there is disposed a mirror 14. The mirror 14 is about 80% transmittent, 5% absorbent, and 15% reflectant. The mirror 14 is also disposed at an angle so that the light coming through the opening 12 is reflected thereby onto a totally reflecting mirror 15, best shown in Figures 1 and 3. The light transmitted by the mirror 14, falls upon the film 13, carried within the camera 25 which is secured to the housing by an adapter 27. The reflected portion of the light from the lens passes upwardly through a ground glass or a field lens 16, upon which there is inscribed a recticule 24 (see Figures 1 and 4).

Light leaving the ground glass 16 is picked up by a magnifying lens 20 and directed at the totally reflecting mirror 21. The mirror 21 is disposed at an angle as shown in Figure 3, and directs the light at a second magnifying lens 20a. A partially light transmitting mirror 19 receives the light from the lens 20a and reflects it, through the eye-piece lens 18, to the observer 17. The mirror 19 is 90% reflectant, 5% absorbent and 5% transmittent. The eye-piece lens 18, and lenses 20 and 20a collimate the recticule and ground glass into infinity. The partially light transmitting mirror 19, lenses 18, 20, 20a, and totally reflecting surface mirror 21, constitute a magnifying and reflecting system whereby the observer 17 will see a real image of whatever is in the field of the lens 10. Lenses 23 and 18 work as an inverted telescope and reduce the image, thereby giving a wide angle view of the target at infinity. Thus both the target and reticule appear at infinity even though the eye of the observer may move about in looking through the finder.

Since the wide angle image is viewed directly it is brighter than the telescopic picture which is viewed through the operaton of the first partially reflecting mirror having only a 15% reflectivity. The result is a bright wide angle picture superimposed upon a somewhat darker telescopic image when the wide angle system is in use.

A shutter 22 is disposed in front of the mirror 19, and behind the lens 23, for a hereinafter disclosed purpose. The shutter 22 may be shifted to block the line of sight of the observer when looking through the lens 18 and the mirror 19 at the front lens 23. When the shutter 22, which is opaque, is between the lenses 18 and 23, the observer 17 can only see the enlarged image coming through the telescopic lens 11.

Figure 4:
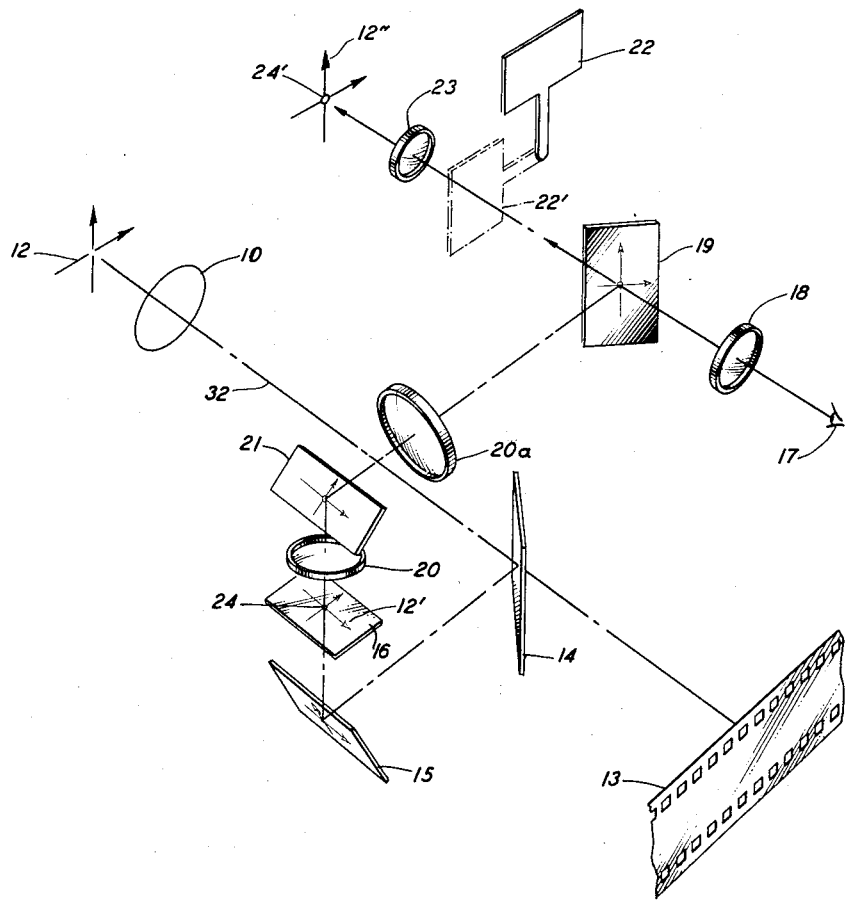
Figure 4 is a somewhat diagrammatic view of a reflex finder according to the present invention showing various paths of light and the optical elements involved in the present invention.

However, when the shutter 22 is raised to the position shown in full lines in Figure 4, the observer can see a reduced size image indicated at 12″ in Figure 4, erect and correctly oriented. This image 12″ is projected into infinity by means of the lens 18 and 23 and will have the recticule 24 superimposed thereon, forming the combined wide angle image indicated at 24′, in Figure 4. With the shutter 22 out of the line of light as shown in Figure 4, the observer 17 will be able to track an object very easily. Thereafter, the shutter 22 may be dropped into the obscuring position for viewing an enlarged portion of the object which has been located within the reflex finder. Should the object again become lost, the operator has a convenient trigger means 26 for shifting from his telescopic view to a wide angle view and relocating the subject he wishes to photograph or track.

The path of light traversing the various optical elements within the reflex finder may be followed from an examination of Figure 4. In Figure 4, light coming from the object viewed 12, passes through the lens 10 of the telescopic lens member. The light indicated by the dashed lines 32 is directed at the partially light transmitting mirror 14. A portion of the light 32 traverses the mirror 14 and falls upon the film 13. The remainder of the light 32 is reflected from the mirror 14 to totally reflecting mirror 15. Totally reflecting mirror 15 is disposed at an angle with respect to the light beam and directs the light upwardly through the ground glass screen 16. After traversing the ground glass the light passes through magnifying lenses 20 and 20a between which there is disposed the totally reflecting mirror 21. The disposition of mirror 21 is such, that it directs the light 32 at partially reflecting mirror 19. A portion of the light 32 is reflected by the mirror 19 through the eye-piece lens 18, toward the observer 17. Since the mirror 19 is only partially reflecting, the observer 17 can look through it at the front lens 23. The front lens 23 and the eye-piece lens 18 serve as an inverted telescope and the observer 17 therefore sees a wide angle view of the object 12, with the reticule 24 superimposed thereon. The shutter member 22 may be moved into and out of the line of sight of the observer to switch the system from the wide angle to the telescopic position as hereinabove set forth.

From the foregoing it will be seen that there has been provided a reflex finder for a camera which will permit the user thereof, to shift easily from telescopic to wide angle views with a minimum amount of adjustment. There has also been disclosed a means for superimposing a reticule upon a distant object for target location and tracking.

Having thus fully described the invention, what is claimed as new and desired to be secured by Letters Patent of the United States, is:

1. A reflex view finder for a camera comprising, a housing having front and rear walls, an opening in the front wall of the housing, an opening in the rear wall of the said housing opposite the front opening, means to secure the lens of a camera to the front wall in register with the opening, means to secure the camera to the rear wall and adjacent the rear wall opening to receive light coming through said opening, a first partially reflecting mirror diagonally carried within the housing between the housing openings, a first totally reflecting mirror within the housing, spaced from the first partially reflecting mirror to receive light reflected from the first partially reflecting mirror and angularly disposed with respect thereto, a magnifying lens system disposed in the path of the light reflected from the first totally reflecting mirror, a second totally reflecting mirror within the housing to receive light from the first totally reflecting mirror and angularly disposed with respect thereto, a ground glass screen between the said first and second totally reflecting mirrors, a second partially reflecting mirror within the housing disposed in the path of light coming from the second totally reflecting mirror and angularly positioned with respect to the axis of said light path, an eye-piece carried by the rear wall behind the second partially reflecting mirror to receive light reflected therefrom and transmitted therethrough, a negative lens carried by the front wall of the housing opposite said eye-piece, a swingable shutter within the housing between the negative lens and the second partially reflecting mirror.

2. A reflex view finder for a camera comprising, a housing having front and rear walls, an opening in the front wall of the housing, an opening in the rear wall of the said housing opposite the front opening, means to secure the lens of a camera to the front wall in register with the opening, means to secure the camera to the rear wall and adjacent the rear wall opening to receive light coming through said opening, a first partially reflecting mirror diagonally carried within the housing between the housing openings, said mirror being of the order of 80% transmittent and 15% reflectant, a first totally reflecting mirror within the housing spaced from the first partially reflecting mirror to receive light reflected from the first partially reflecting mirror and angularly disposed with respect thereto, a magnifying lens system disposed in the path of the light reflected from the first totally reflected mirror, a second totally reflecting mirror within the housing to receive light from the first totally reflecting mirror and angularly disposed with respect thereto, a ground glass screen between the said first and second totally reflecting mirror, a second partially reflecting mirror within the housing disposed in the path of light coming from the second totally reflecting mirror and angularly positioned with respect to the axis of said light path, said second partially reflecting mirror being of the order of 5% transmittent and 90% reflectant, an eye-piece carried by the rear wall behind the second partially reflecting mirror to receive light reflected therefrom and transmitted therethrough, a negative lens carried by the front wall of the housing opposite said eye-piece, a swingable shutter within the housing between the negative lens and the second partially reflecting mirror.

3. A reflex view finder for a camera comprising, a housing having front and rear walls, an opening in the front wall of the housing, an opening in the rear wall of the said housing opposite the front opening, means to secure the lens of a camera to the front wall in register with the opening, means to secure the camera to the rear wall and adjacent the rear wall opening to receive light coming through said opening, a first partially reflecting mirror diagonally carried within the housing between the housing openings, a first totally reflecting mirror within the housing, spaced from the first partially reflecting mirror to receive light reflected from the first partially reflecting mirror and angularly disposed with respect thereto, a magnifying lens system disposed in the path of the light reflected from the first totally reflected mirror, a second totally reflecting mirror within the housing to receive light from the first totally reflecting mirror and angularly disposed with respect thereto, a ground glass screen between the said first and second totally reflecting mirror, a recticule on said screen, a second partially reflecting mirror within the housing disposed in the path of light coming from the second totally reflecting mirror and angularly positioned with respect to the axis of said light path, an eye-piece carried by the rear wall behind the second partially reflecting mirror to receive light reflected therefrom and transmitted therethrough, a negative lens carried by the front wall of the housing opposite said eye-piece, a swingable shutter within the housing between the negative lens and the second partially reflecting mirror and trigger means for shifting the shutter into and out of the path of light traversing the negative lens to change the finder from the telescopic to wide angle operation.

4. A reflex view finder for a camera comprising, a housing having front and rear walls, an opening in the front wall of the housing, an opening in the rear wall of the said housing opposite the front opening, means to secure the lens of a camera to the front wall in register with the opening, means to secure the camera to the rear wall and adjacent the rear wall opening to receive light coming through said opening, a first partially reflecting mirror diagonally carried within the housing between the housing openings, said mirror being of the order of 80% transmittent and 15% reflectant, a first totally reflecting mirror within the housing, spaced from the first partially reflecting mirror to receive light reflected from the first partially reflecting mirror and angularly disposed with respect thereto, a magnifying lens system disposed in the path of light reflected from the first totally reflecting mirror, a second totally reflecting mirror within the housing to receive light from the first totally reflecting mirror and angularly disposed with respect thereto, a ground glass screen between the said first and second totally reflecting mirror, a reticule on said screen, a second partially reflecting mirror within the housing disposed in the path of light coming from the second totally reflecting mirror and angularly positioned with respect to the axis of said light path, an eye-piece carried by the rear wall behind the second partially reflecting mirror to receive light reflected therefrom and transmitted therethrough, a negative lens carried by the front wall of the housing opposite said eye-piece and a swingable opaque shutter within the housing between the negative lens and the second partially reflecting mirror and trigger means for shifting the shutter into and out of the path of light traversing the negative lens to change the finder from telescopic to wide angle operation.

References Cited in the file of this patent
UNITED STATES PATENTS

| | | |
|---|---|---|
| 1,484,584 | Tavern et al. | Feb. 19, 1924 |
| 2,219,314 | Hoch | Oct. 29, 1940 |
| 2,481,082 | Chew | Sept. 6, 1949 |